United States Patent [19] [11] 3,742,218
Fleming, Jr. [45] June 26, 1973

[54] AIR COLUMN DENSITY VARIATION INSENSITIVE NUCLEONIC GAUGING SYSTEM

[75] Inventor: John W. Fleming, Jr., Columbus, Ohio

[73] Assignee: Industrial Nucleonics Corporation, Columbus, Ohio

[22] Filed: Jan. 31, 1972

[21] Appl. No.: 222,171

Related U.S. Application Data

[63] Continuation of Ser. No. 877,196, Nov. 17, 1969, abandoned.

[52] U.S. Cl............................250/381, 250/514
[51] Int. Cl...................... G01n 23/00, G01n 23/16
[58] Field of Search...................... 250/83.3 D, 105, 250/106 S

[56] References Cited
UNITED STATES PATENTS 3,376,419   4/1968   Schumacher................250/83.3 D
3,493,755   2/1970   Hannula.........................250/83.3 D Primary Examiner—Archie R. Borchelt
Attorney—William T. Fryer, III

[57] ABSTRACT

A nucleonic gauge includes a source in a sealed housing and a spaced detector and in which the space between the detector and the pass gap is substantially evacuated, and in which the space between the source and the source window is substantially evacuated to eliminate variations in air density in the air column which otherwise exists between the source and the detector. A standard ion chamber is employed for the detector with a second chamber inserted between the source and the ion chamber which may form part of the collimator which second chamber is pumped to a near vacuum. The arrangement maintains a reasonable spacing between the source and the detector and reduces the effects of vertical deflection on gauge sensitivity.

7 Claims, 3 Drawing Figures

PATENTED JUN 26 1973

INVENTOR
JOHN W. FLEMING, JR.
BY
Marechal, Biebel, French & Bugg
ATTORNEYS

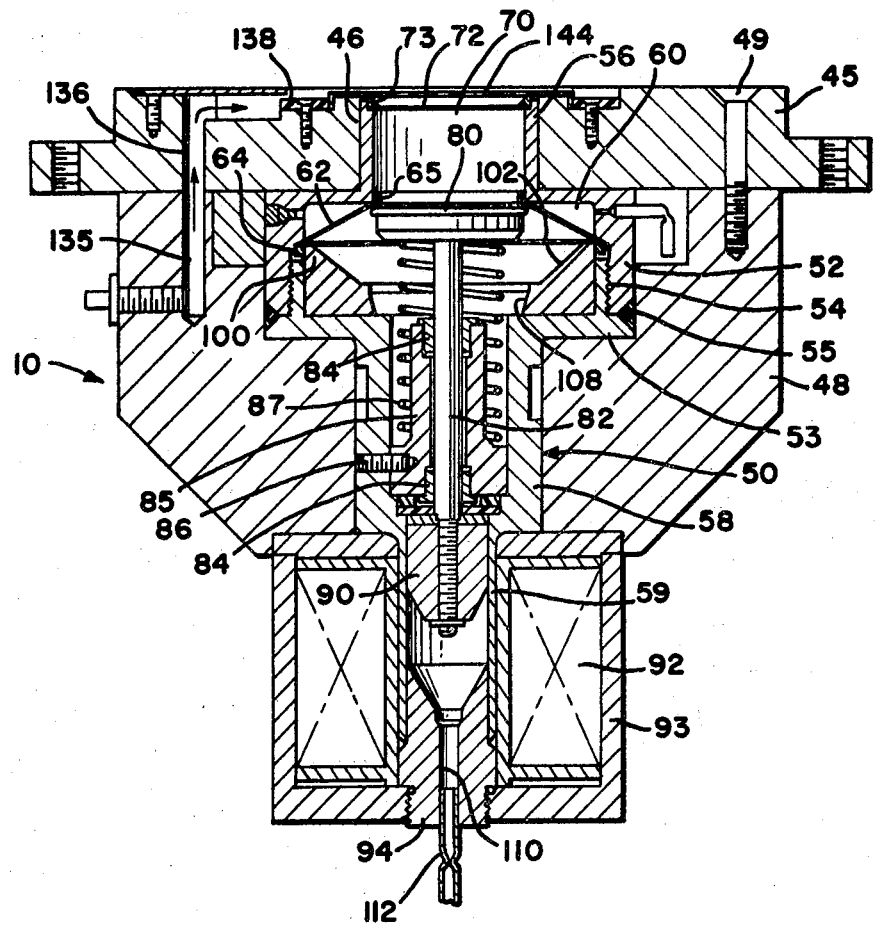

AIR COLUMN DENSITY VARIATION INSENSITIVE NUCLEONIC GAUGING SYSTEM

This is a continuation of application Ser. No. 877,196, filed Nov. 17, 1969 now abandoned.

BACKGROUND OF THE INVENTION

In highly sensitive nucleonic gauges it is known that density changes of the air column defined between the source and the detector can cause substantial errors to occur in the measurement of the basis weight of material passing through the gauge. Attempts have been made to reduce the effect of the air column such as by maintaining the air column at some constant temperature, or by measuring the actual temperature and then feeding in a correction signal. A further obvious means of reducing the effect of variations in air density is that of moving the source and detector closer together so as to reduce the dimensions of the air column.

The sensitivity of a nucleonic gauge is a function of the radiation intensity at the detector and is expressed by the simplified equation:

$$I_D = K\, I_S/d^2$$

where $I_D$ = radiation intensity at detector, $I_S$ = intensity at source, $K$ is a constant, $d$ is the distance between the source and detector. However, moving the source and detector closer together vastly increases and sensitivity of the system to vertical deflection. This sensitivity to vertical deflection can be expressed by the following simplified equation:

$$I_D/d = K\, I_S/d^3 - 2$$

The above relationship therefore shows that vertical deflection sensitivity varies inversely as the cube of the total distance $d$ between the source and the detector.

SUMMARY OF THE INVENTION

A nucleonic gauge for measuring basis weight and the like, such as a beta gauge, can be made to be substantially free of error due to changes in density in the air column by an arrangement which effectively eliminates the major portion of the column separating the source from the column. To this end, the source housing is formed with a hermetically sealed window and the interior of the source housing is substantially evacuated to a near vacuum. The detector on the other hand, is normally an ion chamber, and therefore contains a gaseous medium at a known and preselected pressure. However, the space between the ion chamber and the pass gap through which the material being measured moves may be evacuated, and to this end the collimator itself may be formed with a hermetically sealed window and evacuated to a near vacuum. Further, in order to increase the distance $d$ and to decrease the sensitivity of the gauge to changes in that distance which are the result of vertical deflection of the system, a second evacuated chamber may be added between the collimator and the ion chamber formed with upper and lower windows through which the nucleonic energy may readily pass from the source to the ion chamber.

By evacuating the source head, and by evacuating the collimator and, if preferred, by inserting an additional evacuated chamber, the error which is caused by air density is effectively isolated to the relatively small region of the pass gap, and this remaining source of error can thus be dealt with by conventional means.

BRIEF DESCRIPTION OF THE DRAWINGS

FIG. 3 is a vertical section through the source head.

DESCRIPTION OF PREFERRED EMBODIMENT

Figure 1:
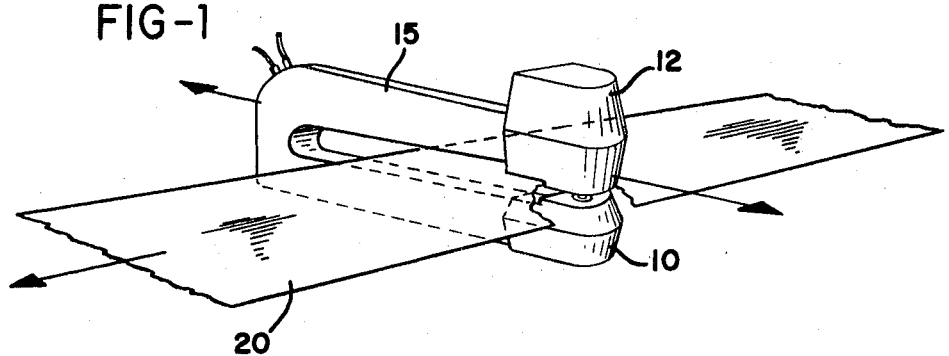
FIG. 1 is a perspective view showing a typical embodiment of the invention.

Referring to the figures of the drawing which illustrate a preferred embodiment of the invention, a typical beta gauge is illustrated at FIG. 1 as including a source head 10 and a detector head 12 mounted on the ends of a C-bracket support 15 in vertically spaced apart relation defining a pass gap 18 (FIG. 2) therebetween. The support 15 is mounted on guideways (not shown) for movement in a direction transverse to that of a web 20, the thickness of basis weight of which is to be measured by the present invention. The structural support and arrangement of the source and detectors of this invention and the provision of traversing movement to obtain profile measurements may be accomplished, for example, in the manner shown in U. S. Pat. Nos. 3,006,225 and 3,108,844 which show C-bracket nucleonic gauges. Further, it is within the scope of this invention to employ any suitable means for mounting the source and detector in spaced relation. For example, these may be mounted, in a suitable installation, on stationary supports or may be mounted for traversing movement on an O-bracket frame as shown, for example, in U.S. Design Pat. No. D-183,213.

Figure 2:
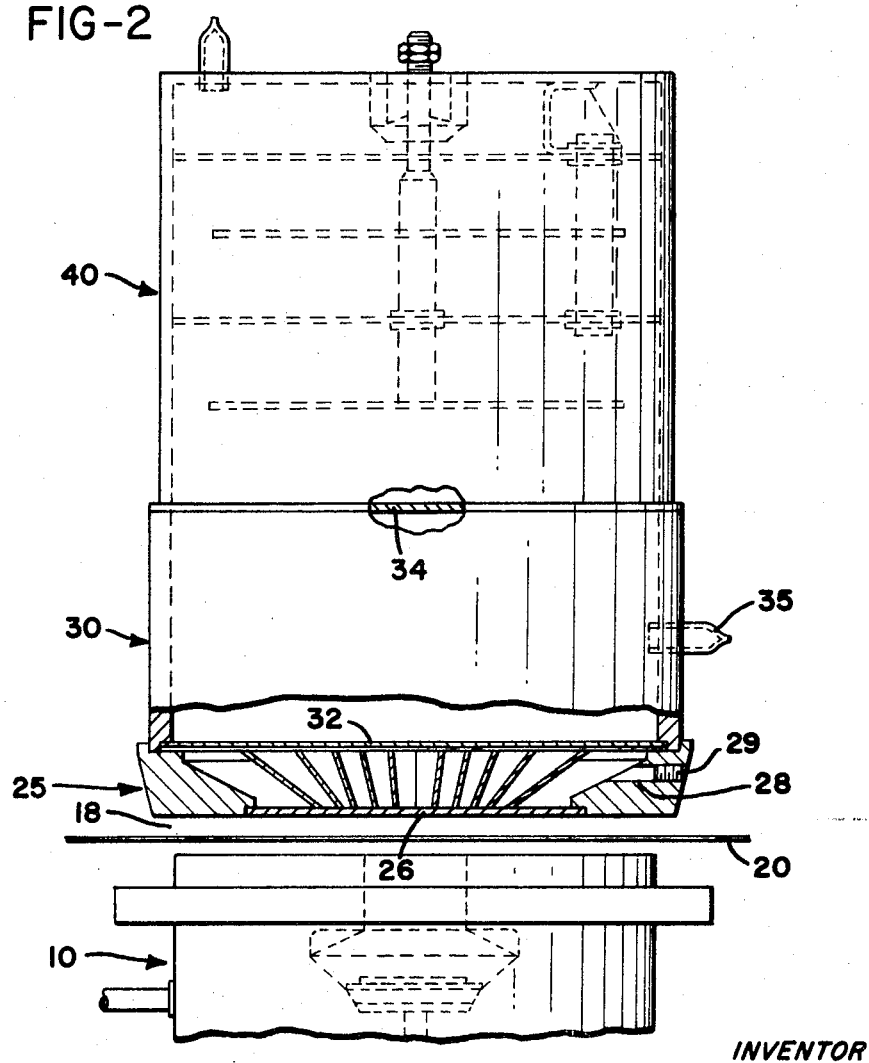
FIG. 2 is an enlarged partially broken away end view of the source head and detector head of this invention.

The detector head 12 is shown in somewhat greater detail in FIG. 2 as including a collimator 25 which may be constructed generally according to the teachings of U.S. Pat. No. 3,373,286. For this purpose, the collimator is formed with a lower thin stainless steel window 26 through which nucleonic energy may readily pass. The interior of the collimator is evacuated through a passageway 28 which is closed by a seal 29.

In my preferred embodiment, I mount a sealed cylindrical chamber 30 in superimposed relation to the collimator 25. The chamber 30 may, if desired, be formed with a lower stainless or mica window element 32 forming a common wall or divider between it and the collimator 25. However, the wall 32 may be omitted and the chamber 30 thus formed integrally with the collimator 25. The chamber 30 is further formed with an upper window wall 34, and it may be evacuated to a near vacuum through the seal 35. However, if the chamber 30 is formed integrally with the collimator 25, the wall 32 may be omitted and the combined chamber and collimator may be evacuated through either the seal 35 or the passageway 29.

Mounted on top of the chamber 30 is a conventional ion chamber 40 which may be constructed in accordance with U.S. Pat. No. 3,396,275. The chamber 40 receives radiation energy through the upper window 34 of the evacuated chamber 30. The employment of the chamber 30 results in an increase in the distance between the source head and the ion chamber 40 thus substantially reducing the sensitivity of the system to errors due to vertical deflection. The windows and walls of the chamber 30 and collimator 25 are under a constant stress condition and are therefore not subject to deflection with changes in air pressure.

It is also within the scope of this invention to provide an evacuated source head, and reference may be had to FIG. 3 for details of a preferred head for this arrangement. The source head 10 includes an upper housing support and cover plate 45 which also forms a portion of the source shield. The plate 45 is formed in a generally annular shape and defines a central opening 46. Depending from the cover 45 is a main source shield and housing 48 which is similarly formed with an enlarged central cavity to receive a source and shutter housing assembly 50. The housing 48 is supported from the plate 45 by a series of machine screws 49.

The assembly 50 is formed in an upper housing 52 and a lower housing 53 which are threaded together at 54 and annularly welded at 55 after assembly to form a sealed unit. The upper housing 52 has a reduced neck portion 56 which extends axially through the opening 46 in the cover plate 45. The lower housing 53 has a lower portion 58 of reduced diameter received within the housing 48 and a continuing lower extension or extremity 59 which extends below the housing 48.

The assembly 50 forms the means in the source head 10 for containing a source of nucleonic energy. For this purpose, the upper housing 52 is formed with an annular cavity indicated, generally at 60, by a sloping annular stainless steel window 62. The window 62 is supported in sealed relation to the upper housing 52 by means of a pair of rings 64 and 65 which are silver soldered to the housing 52. The cavity 60 defines a space for receiving a source of beta energy, and may comprise the inert gas Krypton 85 which may be inserted within the space 60 and sealed under a positive pressure.

The upper portion of the housing 52 extending axially through the plate 45 forms a radiation aperture 70, and the cavity 60 is arranged in circumferential relation with respect to the aperture 70. The annular stainless steel window 62 is arranged at an angle to direct beta energy generally inwardly into the body defined by the upper and lower source housings and away from the aperture 70, so that the beta rays are not emitted directly from the source 60 through the aperture 70. It is, however, within the scope of the present invention to employ a direct radiating source such as shown in U.S. Pat. No. 3,087,061.

The aperture 70 is closed adjacent its upper extremity by a thin mica window 72 and is hermetically sealed to the cylindrical portion 56 by a ring 73. Preferably, the mica window is glass bonded to the ring 73 to form an air tight seal with the upper housing 52.

The housing of this invention further includes a shutter which is movable from a retracted position in which the aperture 70 is effectively open to a closed position, as shown in full lines in FIG. 3, in which beta energy is effectively blocked from escaping through the aperture. The shutter of this invention comprises a head 80 and an attached plunger or rod 82. The head 80 is formed of high density material, such as tungsten. The rod 82 is mounted for guiding movement on a pair of bushings 84 received within a tubular guide 85, the latter being keyed within the lower portion 58 of the housing 52 by a set screw 86. A coiled compression spring 87 is received over the rod 82 between the head 80 and the ledge on the guide 85 for urging the shutter into the closed position with the aperture 70.

The lower end of the rod 82 supports an armature 90 which is received for sliding movement within the cylinder portion 59. An electric solenoid coil 92 is mounted within a coil housing 93 and received over the outside of the depending cylindrical portion 59 for operating the shutter 80. The lower end of the portion 59 is closed by an armature stop 94.

The source head of this invention operates on the principles of beta energy softening by reason of the impingement of the beta rays from the source window 62 onto suitable reflector or target material. The target material includes an annular insert 100 received within the enlarged upper portion of the housing 53 and having a generally upwardly facing frusto-conical surface 102. The insert 100 may be formed of any suitable known beta softening material to achieve a desired energy shifting in accordance with its atomic weight. The insert 100 has an axial aperture 108 into which the shutter head 80 moves in its retracted position. In this position, the upper surface of the shutter forms, in effect, a relatively unbroken continuation of the surface 102, and is also formed of target material. Accordingly, in the retracted position of the shutter, the emitted beta energy from the source window 62 impinges upon the target surface 102 and the head 80; and a portion is redirected outwardly through the aperture 70.

The stop 94 is formed with an internal passageway 110 leading into the interior of the housing 50, which passageway is terminated by a seal 112. The passageway 110 and the seal 112 form the means by which the interior of the housing 50 may be evacuated substantially to a near vacuum condition so that there is effectively an absence of air between the source and the window 72. In this condition, the window 72 is under constant stress, and thus the geometry of the window remains constant in use.

The head 10 may also include a conduit 135 connected with a corresponding conduit 136 in the cover plate 45 which exits at an orifice 138 for directing air across the source window. If desired, a plastic overlay sheet 144 may be retained on the upper surface of the plate 45 over the window 72 to provide mechanical protection for the window. If desired, the temperature of the air may be controlled so as to obviate, to some extent, changes in the density of the air within the pass gap.

It is accordingly seen that the present invention provides a nucleonic gauge in which much of the adverse affects of changes in air density are eliminated by providing for the removal of a substantial portion of the air in the space between the source and detector and providing, if desired, an increased spacing of the source and detector heads from each other thus reducing the sensitivity of the system to vertical deflection.

The advantages of the present invention may be obtained by the evacuation of only one of the source housing or the detector head components. For example, it may be desirable to employ a non-evacuated detector head and collimator substantially as shown in U.S. Pat. No. 3,373,286 with only the cavity within the source housing being evacuated. In such an instance, the interior of the housing 50 would define an evacuated chamber positioned between the source 60 and the detector 40 through which nucleonic energy from the source may readily pass from the detector, thus eliminating errors which could occur as a result of air within the source housing cavity.

While the form of apparatus herein described constitutes a preferred embodiment of the invention, it is to

What is claimed is:

1. A nucleonic gauge for measuring the basis weight of material including a housing having a source of nuclear energy positioned at one side of such material and an ion chamber positioned to receive energy from said source as modified or alternated by said material, the improvement comprising means in said housing defining a cavity including a radiation aperture, window means closing and sealing said cavity at said aperture, said cavity and said window means providing a passage through which radiation energy from said source is transmitted to said material, said cavity being substantially evacuated of air, a collimator having a closed body positioned between said material and said ion chamber for directing said energy to said ion chamber, windows means on said collimator for sealing the interior thereof, said interior of said collimator also being substantially evacuated of air, said collimator interior and said window providing a passage for transmitting radiation from said material to said ion chamber.

2. The gauge of claim 1 further comprising means defining an air tight chamber positioned between said collimator and said ion chamber and adapted for the passage of said energy from said collimator to said ion chamber and also being substantially evacuated of air.

3. A nucleonic gauge including a source housing and a detector housing which gauge is substantially unaffected by changes in air density, comprising means in said source housing defining a cavity, a nucleonic source in said cavity, a radiation aperture opening into said cavity and arranged to limit nucleonic energy from said source, window means closing and sealing said cavity, said cavity and said window means providing a passage for transmitting radiation from said source to the exterior of said source housing, said cavity being substantially evacuated of air, said detecter housing including an ion chamber, and sealed collimator means positioned to direct radiant energy from said source into said ion chamber, said collimator means having at least one window for sealing the interior thereof and for transmitting the radiation which passes through said collimator, said collimator having the interior thereof substantially evacuated of air.

4. In a nucleonic gauge for measuring the basis weight of material including a nucleonic source positioned at one side of the material and a detector positioned at an opposite side of the material adapted to receive energy from the source as attenuated by the material and being relatively insensitive to changes in air density and to deflection between the source and the detector, the improvement comprising means defining a sealed evacuated chamber positioned between said source and said detector through which energy from said source may readily pass to said detector, said chamber having a thin window for sealing the chamber and for transmitting radiation, said chamber increasing the radiation path length between said source and said detector for minimizing the effect of changes in the distance between said source and said detector without substantially increasing the sensitivity of the gauge to air density changes.

5. The gauge of claim 4 further comprising a source housing for containing said source in spaced relation to such material, said housing defining said evacuated chamber.

6. The gauge of claim 4 in which said evacuated chamber defining means is positioned between said material and said detector.

7. The gauge of claim 6 in which said chamber defining means comprises a collimator positioned to receive energy from said source.

* * * * *